(12) United States Patent
Shen et al.

(10) Patent No.: US 10,050,712 B2
(45) Date of Patent: Aug. 14, 2018

(54) METHOD AND DEVICE FOR DETERMINING LOCATION OF OPTICAL SPLITTER

(71) Applicant: SOOCHOW UNIVERSITY, Suzhou, Jiangsu (CN)

(72) Inventors: Gangxiang Shen, Jiangsu (CN); Hao Chen, Jiangsu (CN); Yongcheng Li, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/508,978

(22) PCT Filed: Nov. 2, 2015

(86) PCT No.: PCT/CN2015/093573
§ 371 (c)(1),
(2) Date: Mar. 6, 2017

(87) PCT Pub. No.: WO2017/035946
PCT Pub. Date: Mar. 9, 2017

(65) Prior Publication Data
US 2017/0288778 A1  Oct. 5, 2017

(30) Foreign Application Priority Data
Sep. 1, 2015  (CN) .......................... 2015 1 0551398

(51) Int. Cl.
*H04B 10/27* (2013.01)
*H04B 10/07* (2013.01)
(Continued)

(52) U.S. Cl.
CPC ............ *H04B 10/27* (2013.01); *H04B 10/07* (2013.01); *H04B 10/2504* (2013.01); *H04B 10/272* (2013.01); *H04B 10/00* (2013.01)

(58) Field of Classification Search
None
See application file for complete search history.

(56) References Cited

U.S. PATENT DOCUMENTS

| 2006/0120723 | A1* | 6/2006 | Diouf ................. H04L 12/5601 398/71 |
| 2007/0050485 | A1 | 3/2007 | Zolfaghari |

(Continued)

FOREIGN PATENT DOCUMENTS

| CN | 102355301 A | 2/2012 |
| CN | 102609527 A | 7/2012 |

(Continued)

OTHER PUBLICATIONS

J. Jiang et al., A K-means Algorithm Based on Density and its Application, Engineering of Surveying and Mapping, vol. 24, No. 5, May 31, 2015, pp. 42-46.

(Continued)

*Primary Examiner* — Darren E Wolf
(74) *Attorney, Agent, or Firm* — SZDC Law P.C.

(57) ABSTRACT

A method and a device for determining a location of an optical splitter are provided. With the method, optical network units in a PON network are classified into K clusters based on locations of the optical network units with a K-means clustering-based algorithm. Distances between multiple optical network units in the same cluster are small. If it is determined that the number of the optical network units in each of the clusters does not exceed a threshold, a central office is added into the K clusters to obtain K new clusters; and for each of the new clusters, a location of an optical splitter corresponding to the new cluster is determined, so as to ensure that a sum of distances between the location of the optical splitter and locations of all elements in the new cluster is minimized.

6 Claims, 8 Drawing Sheets

(51) Int. Cl.
*H04B 10/25* (2013.01)
*H04B 10/272* (2013.01)
*H04B 10/00* (2013.01)

(56) References Cited

U.S. PATENT DOCUMENTS

| | | | | |
|---|---|---|---|---|
| 2007/0127923 | A1* | 6/2007 | Dalton | H04B 10/27 398/71 |
| 2010/0003030 | A1* | 1/2010 | Gilfedder | H04L 41/0856 398/67 |
| 2013/0194308 | A1* | 8/2013 | Privault | G06T 11/60 345/650 |

FOREIGN PATENT DOCUMENTS

| CN | 102609783 | A | 7/2012 |
|---|---|---|---|
| CN | 103561463 | A | 2/2014 |
| CN | 104618134 | A | 5/2015 |
| WO | 2015054300 | A1 | 4/2015 |

OTHER PUBLICATIONS

M. Xu et al. Optimization of the Passive Optical Networks Based on Class Gathering Methods, Study on Optical Communications, Mar. 31, 2002, vol. 3, Sum No. 111, pp. 20-23.

H. Zhang et al., Planning Algorithm for WCDMA Based Station Location Problem Based on Cluster Decomposition, Control and Decision, vol. 21, No. 2, Feb. 28, 2006, pp. 213-216.

Office Action dated Apr. 28, 2017 from Chinese priority application (CN 201510551398.2) and its English translation.

AKira Agata et al., "Suboptimal PON Network Designing Algorithm for Minimizing Deployment Cost of Optical Fiber Cables," Optical Network Design and Modeling, published online on Dec. 24, 2014.

\* cited by examiner

METHOD AND DEVICE FOR DETERMINING LOCATION OF OPTICAL SPLITTER

The present application is the national phase of International Application No. PCT/CN2015/093573, titled "METHOD AND DEVICE FOR DETERMINING LOCATION OF OPTICAL SPLITTER", filed on Nov. 2, 2015, which claims priority to Chinese Patent Application No. 201510551398.2, titled "METHOD AND DEVICE FOR DETERMINING LOCATION OF OPTICAL SPLITTER," filed on Sep. 1, 2015 with the State Intellectual Property Office of People's Republic of China, both of which are incorporated herein by reference in their entireties.

FIELD

The present disclosure relates to the technical field of an optical fiber network, and in particular to a method and a device for determining a location of an optical splitter.

BACKGROUND

Because of the inherent advantages of a fiber-to-the-x (FTTx) network, such as a super-high bandwidth, a low cost and a strong anti-interference performance, it is widely applied in various aspect of people's life. The FTTx network includes an active optical network (AON) and a passive optical network (PON). The PON is deployed more because of its low cost.

Reference is made to FIG. 1 which is a schematic diagram of a PON network according to the present disclosure. The PON network includes: a central office 1, several optical splitters 2 connected to the central office via optical fibers, and multiple optical network units 3 connected to the optical splitters 2 via optical fibers. Generally, each PON network has a limited optical split ratio which constrains the maximum number of optical network units connected to the same optical splitter.

In a PON network, the location of the central office 1 is fixed, the locations of optical network units are fixed because they are generally arranged at home, and only a location of the optical splitter is changeable. The total deployment cost of the whole PON network mainly depends on the cost of optical fibers and the labor cost of trenching and laying optical fibers. Therefore, it is desired to solve the problem of how to properly determine the number of the optical splitters and the locations of the optical splitters, to minimize a total length of optical fibers in the PON network.

SUMMARY

In view of above, a method and a device for determining a location of an optical splitter are provided according to the present disclosure. With the technical solution for determining a location of an optical splitter in a PON network, a total optical fiber length in the PON network is minimized, thereby reducing the deployment cost.

In order to achieve the above objective, the following solutions are provided.

A method for determining a location of an optical splitter is provided, which includes:

inputting a location of a central office and locations of optical network units in a PON network;

classifying, with a K-means clustering-based algorithm, the optical network units into K clusters based on the locations of the optical network units;

adding the central office to the K clusters to obtain K new clusters if it is determined that the number of the optical network units in each of the K clusters does not exceed a threshold; and determining, for each of the K new clusters, a location of an optical splitter corresponding to the new cluster, where a sum of distances between the location of the optical splitter and the locations of the central office and the optical network units in the new cluster is minimized.

Preferably, if it is determined that there is a cluster having the number of optical network units exceeding the threshold among the K clusters, the method may further includes:

determining the cluster having the number of optical network units exceeding the threshold as a target cluster;

classifying, with the K-means clustering-based algorithm, the optical network units in the target cluster into multiple sub-clusters based on locations of the optical network units in the target cluster; and detecting whether there is a sub-cluster having the number of optical network units exceeding the threshold, and returning to the process of determining the cluster having the number of optical network units exceeding the threshold as a target cluster, if it is detected that there is a sub-cluster having the number of optical network units exceeding the threshold.

Preferably, the determining a location of an optical splitter corresponding to the new cluster may include:

determining, with the Weiszfeld algorithm, the location of the optical splitter corresponding to the new cluster based on the locations of the central office and the optical network units in the new cluster.

Preferably, in the classifying with a K-means clustering-based algorithm the optical network units into K clusters, a value of K is determined by:

creating a curve by taking the value of K as an argument on an X axis and taking a clustering metric value as a dependent variable on a Y axis, where the clustering metric value is defined as an average value of clustering index values of the K clusters classified with the K-means clustering-based algorithm; and selecting a value of K corresponding to a point in the curve having a maximum rate of change in the clustering metric value, as a target value of K.

Preferably, the method may further include:

constituting a target set by the central office and the optical splitters corresponding to the sub-clusters obtained by dividing the target cluster;

determining, with the Weiszfeld algorithm, a location of a target point corresponding to the target set, where a sum of distances between the location of the target point and locations of all elements in the target set is minimized; and determining a route from the location of the central office to the location of the target point as a target fiber conduit route, where the target fiber conduit route is shared by multiple optical fibers arranged between the central office and the optical splitters in the target set.

A device for determining a location of an optical splitter is provided, which includes:

a data receiving unit configured to receive a location of a central office and locations of optical network units in a PON network;

a cluster classifying unit configured to classify, with a K-means clustering-based algorithm, the optical network units into K clusters based on the locations of the optical network units;

a new cluster determining unit configured to add the central office to the K clusters to obtain K new clusters if it is determined that the number of the optical network units in each of the K clusters does not exceed a threshold; and an optical splitter location calculating unit configured to determine, for each of the new clusters, a location of an optical splitter corresponding to the new cluster, where a sum of distances between the location of the optical splitter and locations of the central office and the optical network units in the new cluster is minimized.

Preferably, the device may further include:

a target cluster determining unit configured to determine, if it is determined that there is a cluster having the number of optical network units exceeding the threshold among the K clusters, the cluster having the number of optical network units exceeding the threshold as a target cluster;

a target cluster dividing unit configured to classify, with the K-means clustering-based algorithm, the optical network units in the target cluster into multiple sub-clusters based on locations of the optical network units in the target cluster; and a sub-cluster judging unit configured to detect whether there is a sub-cluster having the number of optical network units exceeding the threshold; and return to perform the operation of the target cluster determining unit if it is detected that there is a sub-cluster having the number of optical network units exceeding the threshold.

Preferably, the optical splitter location calculating unit may include:

a first optical splitter location calculating sub-unit configured to determine, with the Weiszfeld algorithm, a location of an optical splitter corresponding to the new cluster based on the locations of the central office and the optical network units in the new cluster.

Preferably, the cluster classifying unit may include:

a curve creating unit configured to create a curve by taking a value of K as an argument on an X axis and taking a clustering metric value as a dependent variable on a Y axis, where the clustering metric value is defined as an average value of clustering index values of the K clusters classified with the K-means clustering-based algorithm; and a K value selecting unit configured to select a value of K corresponding to a point in the curve having a maximum rate of change in the clustering metric value, as a target value of K.

Preferably, the device may further include:

a target set constituting unit configured to constitute a target set by the central office and the optical splitters corresponding to the sub-clusters obtained by dividing the target cluster;

a target point location determining unit configured to determine, with the Weiszfeld algorithm, a location of a target point corresponding to the target set, where a sum of distances between the location of the target point and locations of all elements in the target set is minimized; and a target fiber conduit route determining unit configured to determine a route from the location of the central office to the location of the target point as a target fiber conduit route, where the target fiber conduit route is shared by multiple optical fibers arranged between the central office and the optical splitters in the target set.

It can be seen from the above technical solution that, with the method according to the embodiments of the present disclosure, the optical network units in a PON network are classified into K clusters based on locations of optical network units with a K-means clustering-based algorithm. Distances between multiple optical network units in the same cluster are small. If it is determined that the number of the optical network units in each of the clusters does not exceed a threshold, the central office is added into the K clusters to obtain K new clusters, and for each of the new clusters, a location of an optical splitter corresponding to the new cluster is determined, so as to ensure that a sum of distances between the location of the optical splitter and locations of all elements in the new cluster is minimized. According to the solution of the present disclosure, the optical network units in the PON network are classified such that close optical network units are classified into the same cluster, and the location of the optical splitter is determined for the clusters, such that a sum of distances between the location of the optical splitter and locations of all elements in the clusters is minimized, which reduces a total optical fiber length and a cost of the whole PON network.

BRIEF DESCRIPTION OF THE DRAWINGS

In order to illustrate technical solutions in embodiments of the present disclosure or the conventional technology more clearly, drawings for description of the embodiments or the conventional technology are introduced simply hereinafter. Apparently, the drawings described in the following only describe the embodiments of the present disclosure. For those skilled in the art, other drawings can be obtained according to the provided drawings without any creative work.

DETAILED DESCRIPTION OF EMBODIMENTS

Hereinafter technical solutions in embodiments of the present disclosure are described clearly and completely in conjunction with drawings in the embodiments of the present disclosure. Apparently, the described embodiments are only a part rather than all of the embodiments of the present disclosure. Any other embodiments obtained based on the embodiments in the present disclosure by those skilled in the art without any creative work fall within the scope of protection of the present disclosure.

Figure 1:
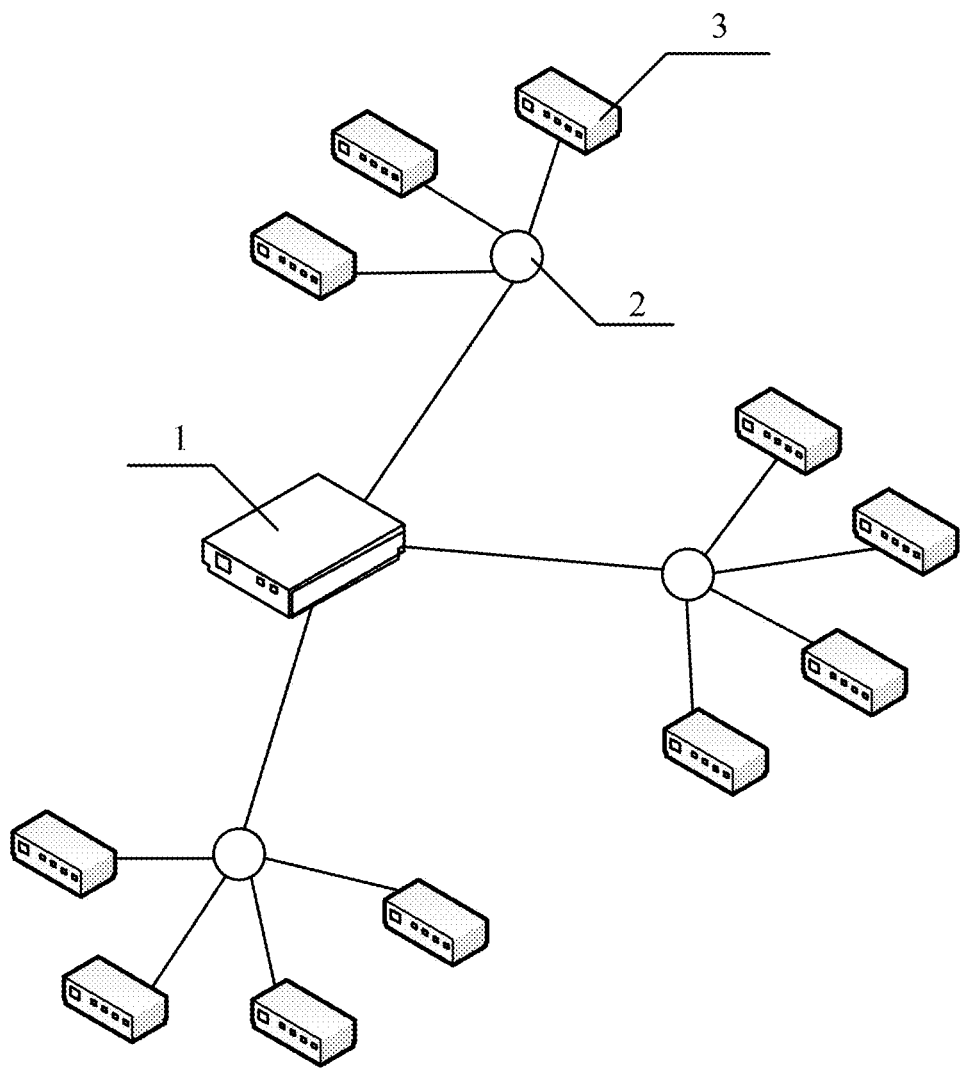
FIG. 1 is a schematic diagram of a PON network according to the present disclosure.
Figure 2:
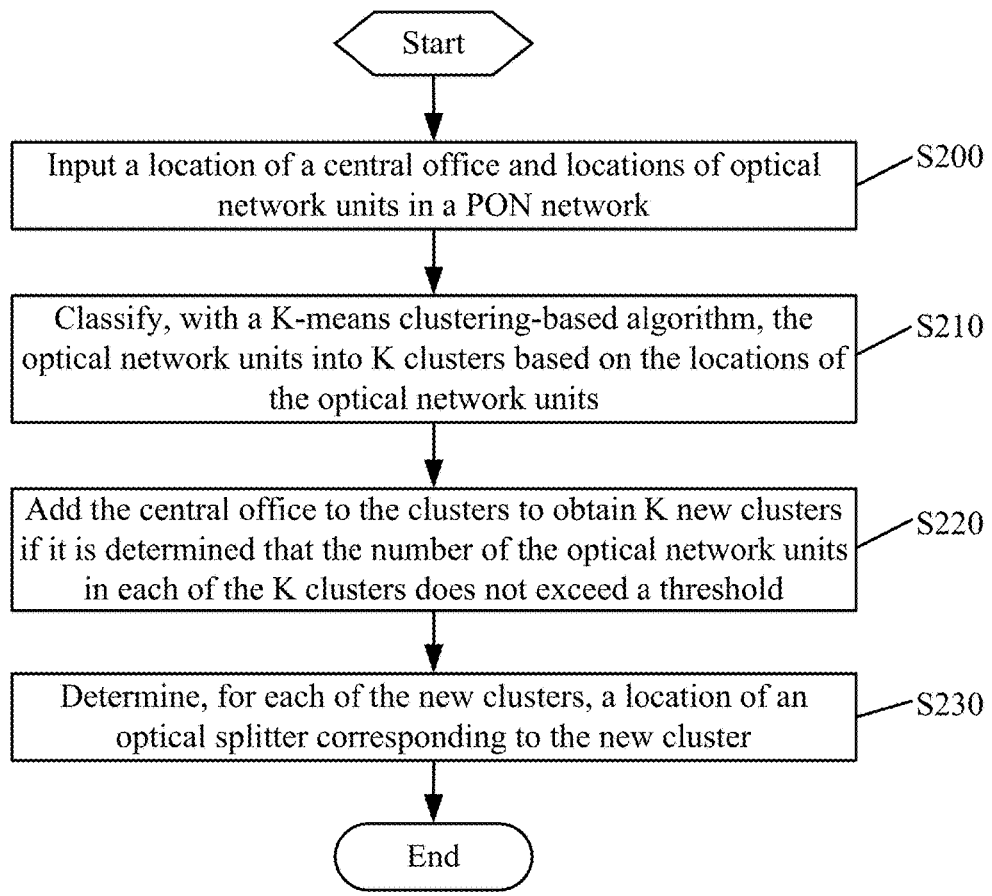
FIG. 2 is a flowchart of a method for determining a location of an optical splitter according to an embodiment of the present disclosure.

Reference is made to FIG. 2, which is a flowchart of a method for determining a location of an optical splitter according to an embodiment of the present disclosure.

As shown in FIG. 2, the method includes step S200 to step S230 in the following.

In step S200, a location of a central office and locations of optical network units in a PON network are received.

Specifically, the location of the central office and the locations of the optical network units in the PON network are fixed. Therefore coordinates of the locations can be acquired.

In step S210, the optical network units are classified into K clusters based on the locations of the optical network units by using a K-means clustering-based algorithm.

Specifically, each optical network unit may be regarded as a point, and the clustering is performed on all points. The clustering may be performed with the K-means clustering-based algorithm. The K-means clustering-based algorithm is an existing algorithm, in which points are classified such that in each cluster, a sum of squares of distances between all the points and a cluster centroid is minimized.

In step S220, the central office is added to the K clusters to obtain K new clusters if it is determined that the number of the optical network units in each of the clusters does not exceed a threshold.

Since each PON network is defined with a maximum optical split ratio, i.e., the maximum number of optical network units connected to the same optical splitter, the maximum optical split ratio may be determined as a threshold in the present disclosure. For K clusters obtained by classifying in the last step, it is detected whether the number of the optical network units in each of the K clusters exceeds the threshold. The central office is added to the K clusters to obtain K new clusters if the number of the optical network units in each of the K clusters does not exceed the threshold.

In step S230, for each of the new clusters, a location of the optical splitter corresponding to the new cluster is determined.

Specifically, each of the new clusters needs to be provided with an optical splitter. The optical splitter is connected to all optical network units and the central office in the new cluster. Therefore, in order to minimize a total optical fiber length, the determined location of the optical splitter needs to meet the condition that a sum of distances between the location of the optical splitter and locations of the central office and the optical network units in the new cluster is minimized.

With the method according to the embodiment of the present disclosure, the optical network units are classified into K clusters based on locations of optical network units in a PON network with a K-means clustering-based algorithm. Distances between multiple optical network units in the same cluster are small. If it is determined that the number of the optical network units in each of the clusters does not exceed a threshold, the central office is added into the K clusters to obtain K new clusters, and for each of the new clusters, a location of an optical splitter corresponding to the new cluster is determined, so as to ensure that a sum of distances between the location of the optical splitter and locations of all elements in the new cluster is minimized. According to the solution of the present disclosure, the optical network units in the PON network are classified such that close optical network units are classified into the same cluster, and the location of the optical splitter is determined for the clusters, such that a sum of distances between the location of the optical splitter and locations of all elements in the clusters is minimized, which reduces a total optical fiber length and a cost of the whole PON network.

Optionally, in the above step S230 of determining for each of the new clusters a location of the optical splitter corresponding to the new cluster, the location of the optical splitter corresponding to the new cluster may be determined based on the locations of the central office and the optical network units in the new cluster by using the Weiszfeld algorithm.

The Weiszfeld algorithm is an existing algorithm, which is not described in detail here.

Next, a process of classifying the optical network units with the K-means clustering-based algorithm is introduced according to the embodiment.

In the K-means clustering-based algorithm, n points are classified into K clusters ($K<n$), and a sum of squares of distances between all points and a cluster centroid is minimized in each of the K clusters.

In using the K-means clustering-based algorithm, an optimum value of K needs to be determined first. The value of K may be determined in multiple manners, and one optional manner is introduced according to the embodiment.

A curve is created by taking the value of K as an argument on an X axis and taking a clustering metric value as a dependent variable on a Y axis, where the clustering metric value is defined as an average value of clustering index values of K clusters classified by using the K-means clustering-based algorithm.

Specifically, the clustering index value may be a maximum value of distances between all points and a cluster centroid in the same cluster. Apparently, the clustering index value may be defined in other forms, for example, a maximum distance between any two points in the same cluster or the like.

A value of K corresponding to a point in the curve having a maximum rate of change in the clustering metric value is selected as a target value of K.

Specifically, different values of K are checked in an ascending order until the clustering metric value does not change significantly with further increase of the value of K, and the corresponding value of K is selected.

After the optimum value of K is determined, clustering is performed based on the determined value of K.

Figure 3:
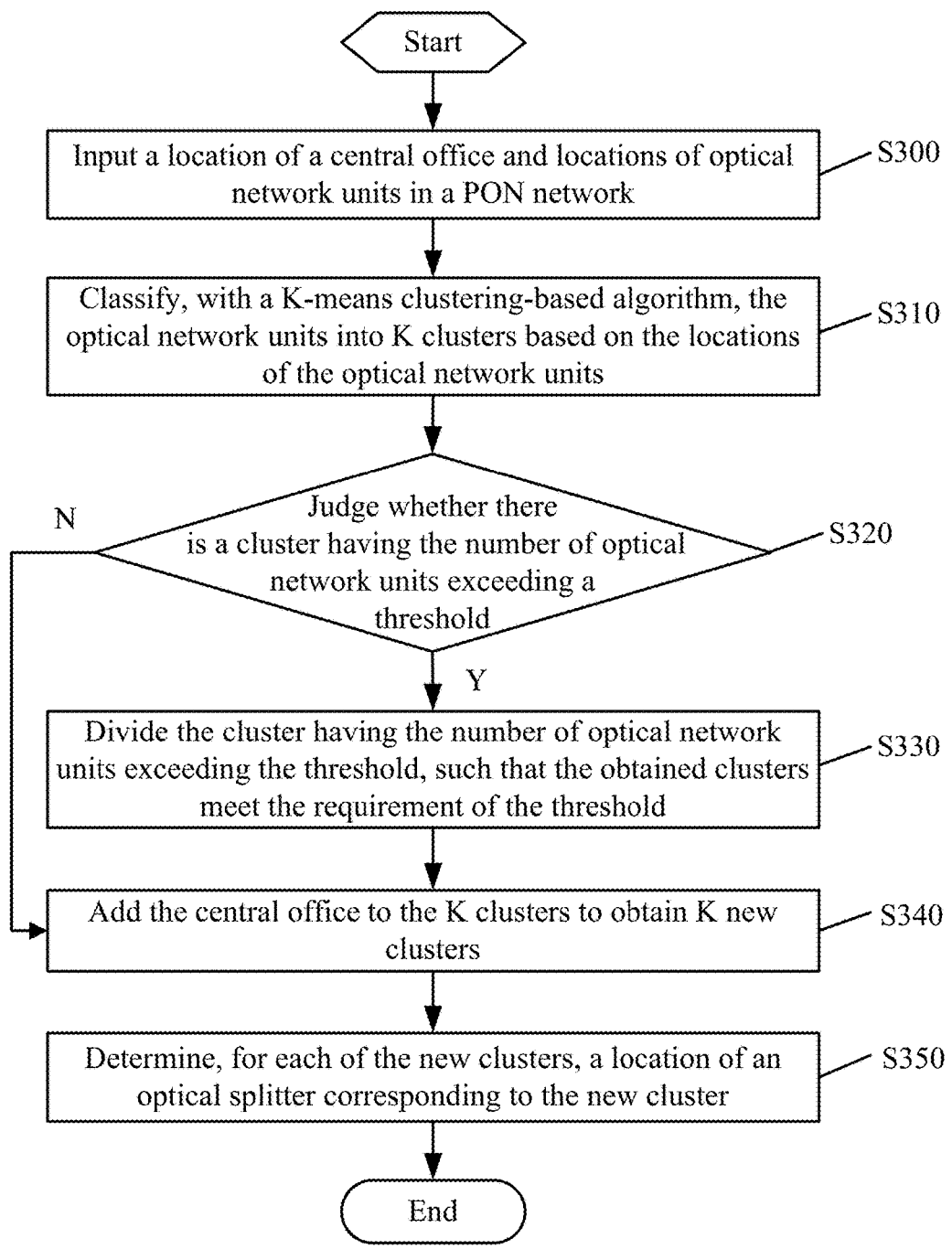
FIG. 3 is a flowchart of another method for determining a location of an optical splitter according to an embodiment of the present disclosure.

Reference is made to FIG. 3 which is a flowchart of another method for determining a location of an optical splitter according to an embodiment of the present disclosure.

As shown in FIG. 3, the method includes step S300 to step S350 in the following.

In step S300, a location of a central office and locations of optical network units in a PON network are received.

Specifically, the location of the central office and the locations of the optical network units in the PON network are fixed. Therefore coordinates of the locations can be acquired.

In step S310, the optical network units are classified into K clusters based on the locations of the optical network units by using a K-means clustering-based algorithm.

Specifically, each optical network unit may be regarded as a point, and the clustering is performed on all points. The clustering may be performed using the K-means clustering-based algorithm. The K-means clustering-based algorithm is an existing algorithm, in which points are classified such that in each cluster a sum of squares of distances between all the points and a cluster centroid is minimized.

In step S320, it is judged whether there is a cluster having the number of optical network units exceeding a threshold.

Step S330 is performed if it is determined that there is a cluster having the number of optical network units exceeding the threshold; and step S340 is performed if it is determined that there is no cluster having the number of optical network units exceeding the threshold.

In step S330, the cluster having the number of optical network units exceeding the threshold is divided, such that the obtained clusters meet the requirement of the threshold, and step S340 is performed.

Specifically, the cluster which does not meet the requirement of the threshold is divided into multiple clusters, such that each of the multiple clusters meets a condition that the number of the optical network units does not exceed the threshold.

The specific dividing manner is described later.

In step S340, the central office is added to the K clusters to obtain K new clusters.

In step S350, for each of the new clusters, a location of the optical splitter corresponding to the new cluster is determined.

Optionally, the above step S330 may be implemented by the following method, including step A to step C.

In step A, the cluster having the number of optical network units exceeding the threshold is determined as a target cluster.

In step B, the optical network units are classified into multiple sub-clusters based on the locations of the optical network units in the target cluster by using the K-means clustering-based algorithm.

In step C, it is determined whether there is a sub-cluster having the number of optical network units exceeding the threshold. Step A is performed if it is determined that there is a sub-cluster having the number of optical network units exceeding the threshold.

In the above-described classifying process, the cluster which does not meet the requirement of the threshold is divided using the K-means clustering-based algorithm, until all the clusters meet the requirement of the threshold.

Apparently, in addition to the above implementation, the division may be performed by other ways. For example, the cluster having the number of optical network units exceeding the threshold may be directly divided into a target number of clusters, where the target number is a ratio of the number of the optical network units in the cluster to the threshold. Apparently, if the ratio is not an integer, the target number may be determined as a minimum integer greater than the ratio.

Figure 4:
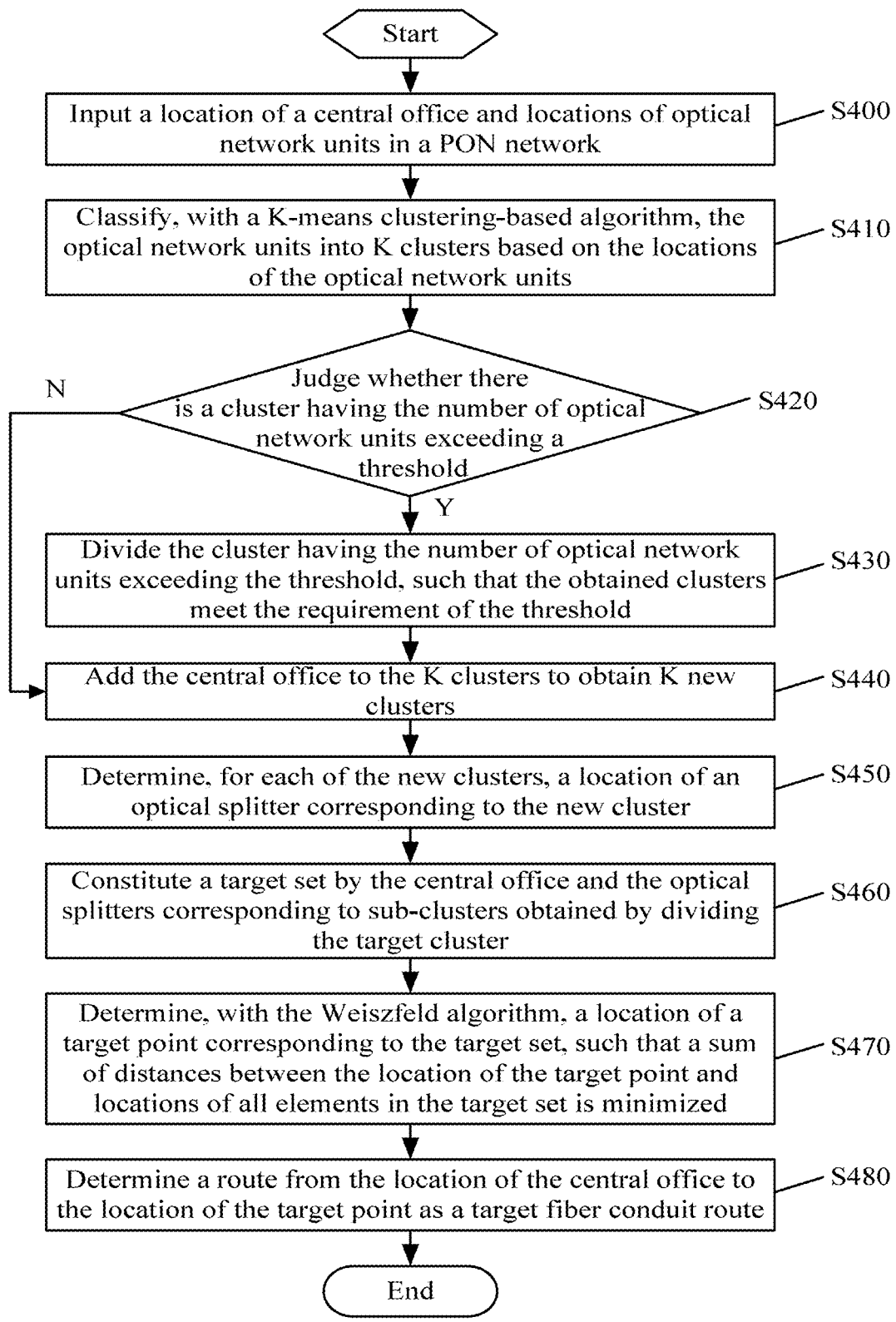
FIG. 4 is a flowchart of another method for determining a location of an optical splitter according to an embodiment of the present disclosure.

Reference is made to FIG. 4 which is a flowchart of another method for determining a location of an optical splitter according to an embodiment of the present disclosure.

As shown in FIG. 4, the method includes step S400 to step S480 in the following.

In step S400, a location of a central office and locations of optical network units in a PON network are received.

Specifically, the location of the central office and the locations of the optical network units in the PON network are fixed. Therefore coordinates of the locations can be acquired.

In step S410, the optical network units are classified into K clusters based on the location of the optical network units by using a K-means clustering-based algorithm.

Specifically, each optical network unit may be regarded as a point, and the clustering is performed on all points. The clustering may be performed using the K-means clustering-based algorithm. The K-means clustering-based algorithm is an existing algorithm, in which points are classified such that in each cluster a sum of squares of distances between all the points and a cluster centroid is minimized.

In step S420, it is judged whether there is a cluster having the number of optical network units exceeding a threshold. Step S430 is performed if it is determined that there is a cluster having the number of optical network units exceeding the threshold; and step S440 is performed if it is determined that there is no cluster having the number of optical network units exceeding the threshold.

In step S430, the cluster having the number of optical network units exceeding the threshold is divided into multiple sub-clusters, such that the sub-clusters meet the requirement of the threshold. Then step S440 is performed.

Specifically, the cluster which does not meet the requirement of the threshold is further divided into multiple clusters meeting the condition that the number of the optical network units does not exceed the threshold.

The specific dividing manner is described later.

In step S440, the central office is added to the K clusters to obtain K new clusters.

In step S450, for each of the new clusters, a location of an optical splitter corresponding to the new cluster is determined.

In step S460, a target set is constituted by the central office and the optical splitters corresponding to the sub-clusters obtained by dividing the target cluster.

In step S470, a location of a target point corresponding to the target set is determined using the Weiszfeld algorithm, such that a sum of distances between the location of the target point and locations of all elements in the target set is minimized.

In step S480, a route from the location of the central office to the location of the target point is determined as a target fiber conduit route.

Specifically, the target fiber conduit route is shared by multiple optical fibers arranged between the central office and the optical splitters in the target set.

As compared with the previous embodiment, in the embodiment, after the locations of the optical splitters for the respective clusters are determined, the location of the target point is determined using the Weiszfeld algorithm for the central office and the optical splitters in sub-clusters obtained by dividing the target cluster, such that a sum of a distances between the location of the target point and locations of the central office and the optical splitters in the sub-clusters is minimized. Further, the route from the central office to the location of the target point is determined as a target fiber conduit route, which is shared by multiple optical fibers arranged between the central office and the optical splitters in the sub-clusters.

Figure 5:
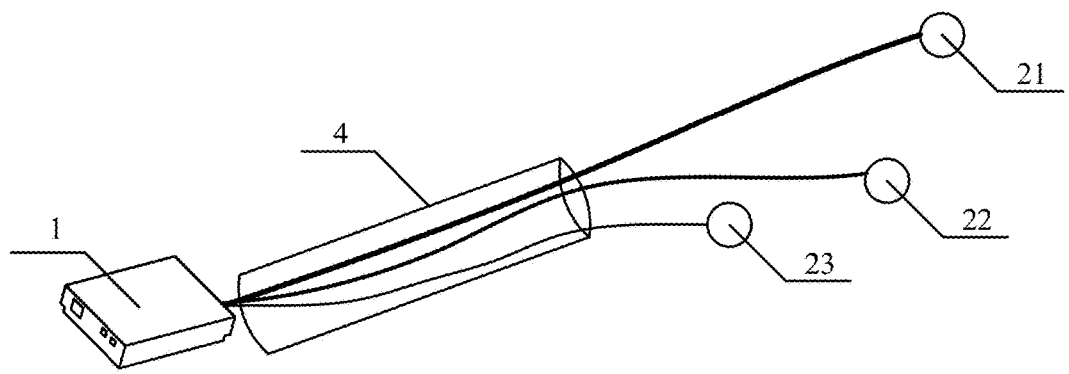
FIG. 5 is a schematic diagram of sharing an optical fiber conduit according to an embodiment of the present disclosure.

Reference is made to FIG. 5 which is a schematic diagram of a shared optical fiber conduit according to an embodiment of the present disclosure.

As shown in FIG. 5, a central office 1 is connected to an optical splitter 21, an optical splitter 22 and an optical splitter 23 via three optical fibers. For a set constituted by the central office 1, the optical splitter 21, the optical splitter 22 and the optical splitter 23, a location of a target point is determined using the Weiszfeld algorithm, and a route from the central office 1 to the location of the target point is determined as a target fiber conduit route 4. The three optical fibers arranged from the central office 1 to the optical splitter 21, the optical splitter 22, and the optical splitter 23 share the target fiber conduit route 4.

The above target fiber conduit route 4 is determined such that a length of the target fiber conduit route 4 and the sum of distances between a far-end of the target fiber conduit route 4 and the optical splitters are minimized, so as to minimize a cost of trenching and laying optical fibers.

Hereinafter a device for determining a location of an optical splitter according to an embodiment of the present disclosure is described. The device for determining a location of an optical splitter described in the following and the method described above may be referred to each other.

Figure 6:
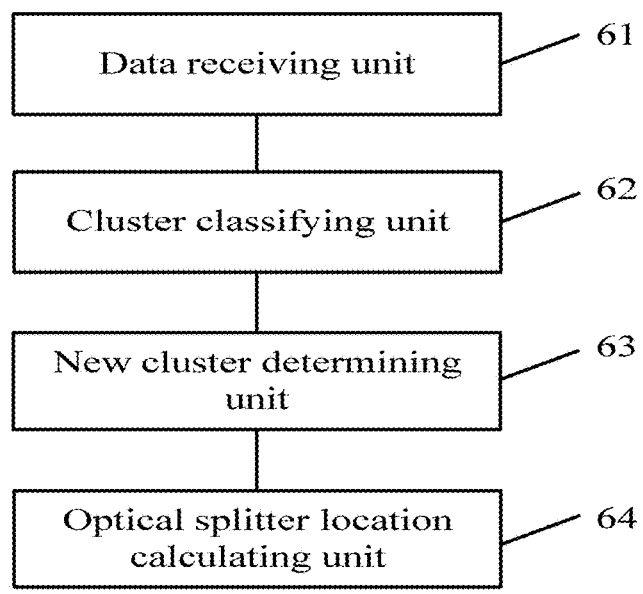
FIG. 6 is a schematic structural diagram of a device for determining a location of an optical splitter according to an embodiment of the present disclosure.

Reference is made to FIG. 6 which is a schematic structural diagram of a device for determining a location of an optical splitter according to an embodiment of the present disclosure.

As shown in FIG. 6, the device includes: a data receiving unit 61, a cluster classifying unit 62, a new cluster determining unit 63, and an optical splitter location calculating unit 64.

The data receiving unit 61 is configured to receive a location of a central office and locations of optical network units in a PON network.

The cluster classifying unit 62 is configured to classify, with a K-means clustering-based algorithm, the optical network units into K clusters based on the locations of the optical network units.

The new cluster determining unit 63 is configured to add the central office to the K clusters to obtain K new clusters if it is determined that the number of the optical network units in each of the clusters does not exceed a threshold.

The optical splitter location calculating unit 64 is configured to determine, for each of the new clusters, a location of an optical splitter corresponding to the new cluster, where a sum of distances between the location of the optical splitter and the locations of the central office and the optical network units in the new cluster is minimized.

With the device according to the embodiment, the optical network units are classified into K clusters based on locations of optical network units in a PON network by using a K-means clustering-based algorithm, where distances between multiple optical network units in the same cluster are small. If it is determined that the number of the optical network units in each of the clusters does not exceed a threshold, the central office is added into the K clusters to obtain K new clusters, and for each of the new clusters, a location of the optical splitter corresponding to the new cluster is determined, so as to ensure that a sum of distances between the location of the optical splitter and locations of all elements in the new cluster is minimized. According to the solution of the present disclosure, the optical network units in the PON network are classified such that close optical network units are classified into the same cluster, and the location of the optical splitter is determined for the clusters, such that a sum of distances between the location of the optical splitter and locations of all elements in the clusters is minimized, which reduces a total optical fiber length and a cost of the whole PON network.

Figure 7:
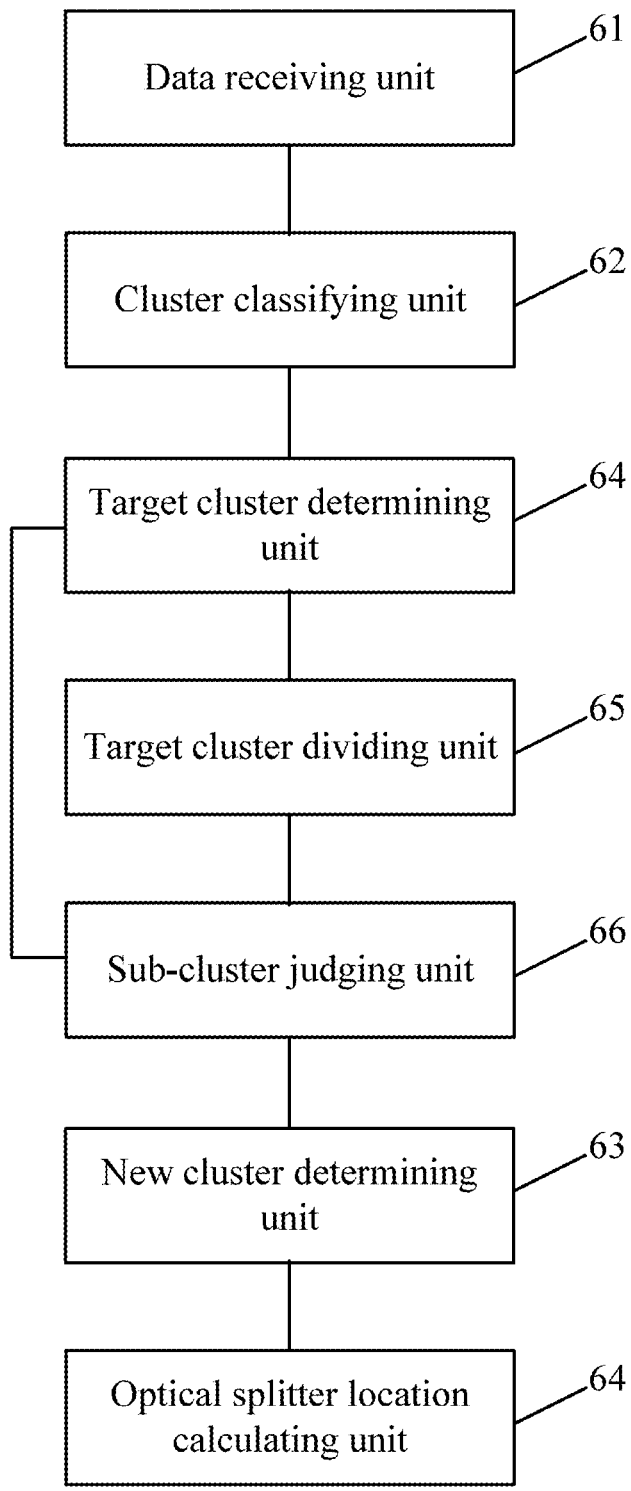
FIG. 7 is a schematic structural diagram of another device for determining a location of an optical splitter according to an embodiment of the present disclosure.

Optionally, FIG. 7 shows another optional structure of the device for determining a location of the optical splitter. In conjunction with FIG. 6 and FIG. 7, the device may further include: a target cluster determining unit 64, a target cluster dividing unit 65 and a sub-cluster judging unit 66.

The target cluster determining unit 64 is configured to determine, if it is determined that there is a cluster having the number of optical network units exceeding the threshold among the K clusters, the cluster having the number of optical network units exceeding a threshold as a target cluster.

The target cluster dividing unit 65 is configured to classify, with the K-means clustering-based algorithm, the optical network units in the target cluster into multiple sub-clusters based on the locations of the optical network units in the target cluster.

The sub-cluster judging unit 66 is configured to detect whether there is a sub-cluster having the number of optical network units exceeding the threshold; and return to perform the operation of the target cluster determining unit 64 if it is determined that there is a sub-cluster having the number of optical network units exceeding the threshold.

Figure 8:
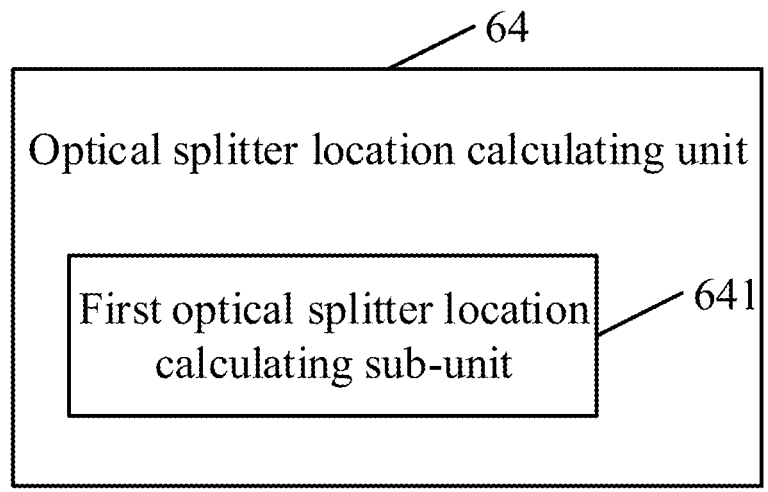
FIG. 8 is a schematic structural diagram of an optical splitter location calculating unit according to an embodiment of the present disclosure.

Optionally, FIG. 8 shows an optional structure of the optical splitter location calculating unit 64 described above. The optical splitter location calculating unit 64 may include a first optical splitter location calculating sub-unit 641.

The first optical splitter location calculating sub-unit 641 is configured to determine with the Weiszfeld algorithm, a location of an optical splitter corresponding to the new cluster based on the locations of the central office and the optical network units in the new cluster.

Figure 9:
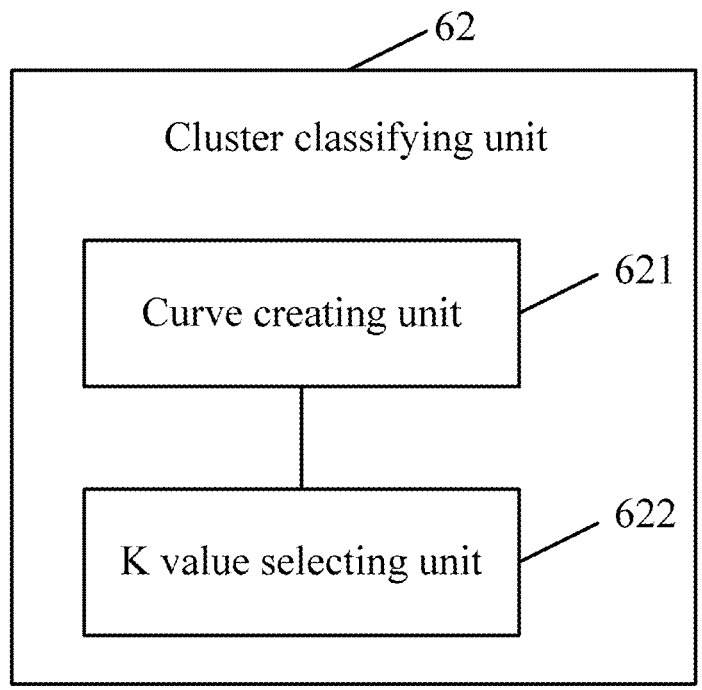
FIG. 9 is a schematic structural diagram of a cluster classifying unit according to an embodiment of the present disclosure.

Optionally, FIG. 9 shows an optional structure of the cluster classifying unit 62 described above. The cluster classifying unit 62 may include: a curve creating unit 621 and a K value selecting unit 622.

The curve creating unit 621 is configured to create a curve by taking a value of K as an argument on an X axis and taking a clustering metric value as a dependent variable on a Y axis, where the clustering metric value is defined as an average value of clustering index values of K clusters classified with the K-means clustering-based algorithm.

The K value selecting unit 622 is configured to select a value of K corresponding to a point in the curve having a maximum rate of change in the clustering metric value, as a target value of K.

Figure 10:
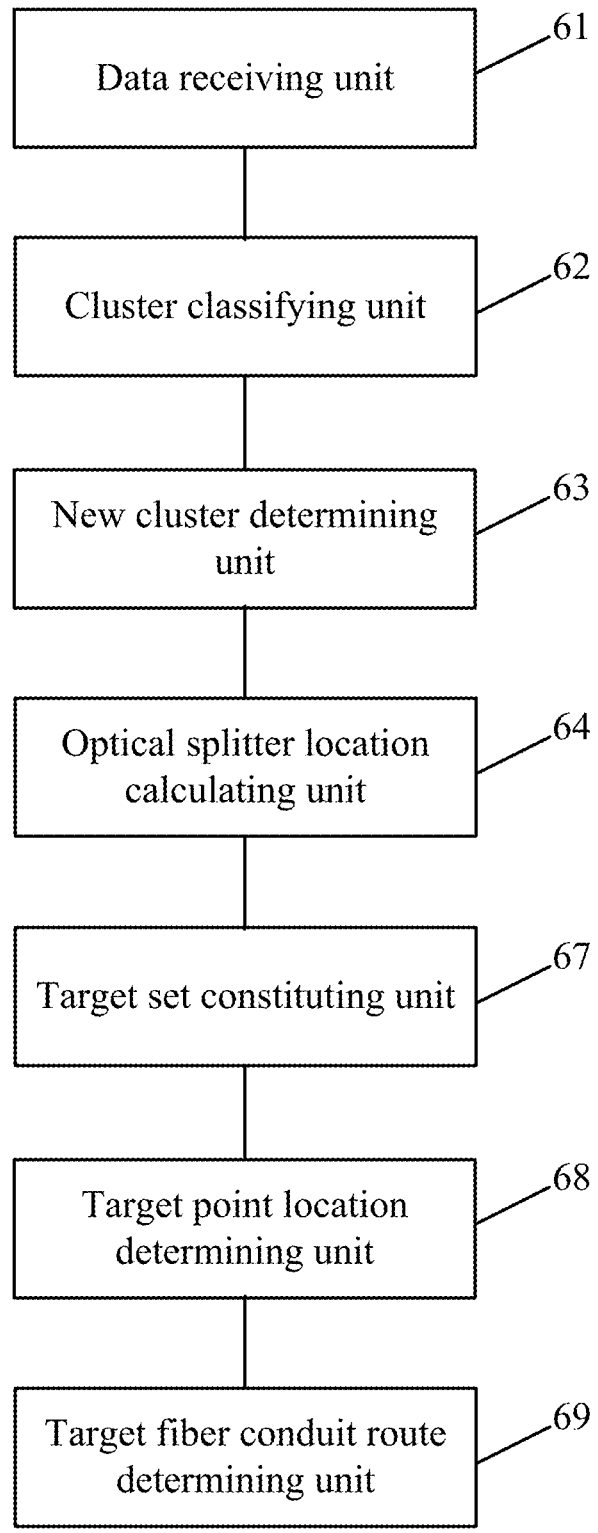
FIG. 10 is a schematic structural diagram of another device for determining a location of an optical splitter according to an embodiment of the present disclosure.

Optionally, FIG. 10 shows another optional structure of the device for determining a location of an optical splitter described above. Referring to FIG. 6 and FIG. 10, the device may further include: a target set constituting unit 67, a target point location determining unit 68, and a target fiber conduit route determining unit 69.

The target set constituting unit 67 is configured to constitute a target set by the central office and the optical splitters corresponding to sub-clusters obtained by dividing the target cluster.

The target point location determining unit 68 is configured to determine, with the Weiszfeld algorithm, a location of a target point corresponding to the target set, where a sum of distances between the location of the target point and locations of all elements in the target set is minimized.

The target fiber conduit route determining unit 69 is configured to determine a route from the location of the central office to the location of the target point as a target fiber conduit route, where the target fiber conduit route is shared by multiple optical fibers arranged between the central office and the optical splitters in the target set.

Finally, it should be noted that, the relationship terminologies such as "first", "second" and the like herein are only used to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) a . . . " does not exclude the case that other similar elements may exist in the process, method, article or device.

Various embodiments in the specification are described in a progressive way, and each embodiment lays emphasis on differences from other embodiments. The same or similar parts between various embodiments may be referred to each other.

The above illustration of the embodiments of the present disclosure can enable those skilled in the art to implement or use the present disclosure. Multiple changes to the embodiments are apparent for those skilled in the art, and the general principles defined herein may be implemented in other embodiments without departing from the spirit or scope of the present disclosure. Therefore, the present disclosure is not limited to the embodiments described herein, but conforms to the widest scope in accordance with the principles and novel features of the present disclosure.

The invention claimed is:

1. A method for determining a location of an optical splitter, comprising:
   inputting a location of a central office and locations of optical network units in a PON network;
   classifying, with a K-means clustering-based algorithm, the optical network units into K clusters based on the locations of the optical network units;
   dividing the cluster having a number of optical network units exceeding a threshold as a maximum optical split ratio if it is determined that there is a cluster having a number of optical network units exceeding the threshold, such that obtained clusters meet the requirement of the threshold;
   adding the central office to the obtained clusters to obtain new clusters;
   determining, for each of the new clusters, a location of an optical splitter corresponding to the new cluster, with a Weiszfeld algorithm, based on the locations of the central office and the optical network units in the new cluster, wherein a sum of distances between the location of the optical splitter and the locations of the central office and the optical network units in the new cluster is minimized; and
   placing the optical splitters at the determined locations in the PON,
   wherein when classifying with a K-means clustering-based algorithm the optical network units into K clusters, a value of K is determined by:
   creating a curve by taking a value of K as an argument on an X axis and taking a clustering metric value as a dependent variable on a Y axis, wherein the clustering metric value is defined as an average value of clustering index values of the K clusters classified with the K-means clustering-based algorithm; and
   selecting a value of K corresponding to a point in the curve having a maximum rate of change in the clustering metric value, as a target value of K.

2. The method according to claim 1, wherein if it is determined that there is a cluster having the number of optical network units exceeding the threshold among the K clusters, the dividing the cluster having the number of optical network units exceeding the threshold further comprises:
   determining the cluster having the number of optical network units exceeding the threshold as a target cluster;
   classifying, with the K-means clustering-based algorithm, the optical network units in the target cluster into a plurality of sub-clusters based on locations of the optical network units in the target cluster; and
   detecting whether there is a sub-cluster having the number of optical network units exceeding the threshold; and
   returning to the process of determining the cluster having the number of optical network units exceeding the threshold as a target cluster, if it is detected that there is a sub-cluster having the number of optical network units exceeding the threshold.

3. The method according to claim 2, further comprising:
   constituting a target set by the central office and the optical splitters corresponding to the sub-clusters obtained by dividing the target cluster;
   determining, with the Weiszfeld algorithm, a location of a target point corresponding to the target set, wherein a sum of distances between the location of the target point and locations of all elements in the target set is minimized; and
   determining a route from the location of the central office to the location of the target point as a target fiber conduit route, wherein the target fiber conduit route is shared by a plurality of optical fibers arranged between the central office and the optical splitters in the target set.

4. A device for determining a location of an optical splitter, comprising a processor and a memory having program instructions stored therein, when the program instructions are executed by the processor, the processor is configured to:
   receive a location of a central office and locations of optical network units in a PON network;
   classify, with a K-means clustering-based algorithm, the optical network units into K clusters based on the locations of the optical network units;
   divide the cluster having the number of optical network units exceeding a threshold as a maximum optical split ratio if it is determined that there is a cluster having the number of optical network units exceeding the threshold, such that obtained clusters meet the requirement of the threshold;
   add the central office to the obtained clusters to obtain new clusters; and
   determine, for each of the new clusters, a location of an optical splitter corresponding to the new cluster, with a Weiszfeld algorithm, based on the locations of the central office and the optical network units in the new cluster, wherein a sum of distances between the location of the optical splitter and locations of the central office and the optical network units in the new cluster is minimized,
   wherein the processor is further configured to:
   create a curve by taking a value of K as an argument on an X axis and taking a clustering metric value as a dependent variable on a Y axis, wherein the clustering metric value is defined as an average value of clustering index values of the K clusters classified with the K-means clustering-based algorithm; and
   select a value of K corresponding to a point in the curve having a maximum rate of change in the clustering metric value, as a target value of K.

5. The device according to claim 4, wherein the processor is further configured to:
   determine, if it is determined that there is a cluster having the number of optical network units exceeding the threshold among the K clusters, the cluster having the number of optical network units exceeding the threshold as a target cluster;
   classify, with the K-means clustering-based algorithm, the optical network units in the target cluster into a plurality of sub-clusters based on locations of the optical network units in the target cluster; and detect whether there is a sub-cluster having the number of optical network units exceeding the threshold; and return to perform the operation of the target cluster determining unit if it is detected that there is a sub-cluster having the number of optical network units exceeding the threshold.

6. The device according to claim 5, wherein the processor is further configured to:

constitute a target set by the central office and the optical splitters corresponding to the sub-clusters obtained by dividing the target cluster;

determine, with the Weiszfeld algorithm, a location of a target point corresponding to the target set, wherein a sum of distances between the location of the target point and locations of all elements in the target set is minimized; and determine a route from the location of the central office to the location of the target point as a target fiber conduit route, wherein the target fiber conduit route is shared by a plurality of optical fibers arranged between the central office and the optical splitters in the target set.

* * * * *